US012650023B1

(12) United States Patent
Whitney

(10) Patent No.: US 12,650,023 B1
(45) Date of Patent: Jun. 9, 2026

(54) TARPAULIN FOR COVERING BUILDING ROOFS AND SURFACES

(71) Applicant: Bee-Sun Solar, LLC, Effingham, IL (US)

(72) Inventor: Kalen Whitney, Effingham, IL (US)

(73) Assignee: Bee-Sun Solar, LLC, Effingham, IL (US)

( * ) Notice: Subject to any disclaimer, the term of this patent is extended or adjusted under 35 U.S.C. 154(b) by 0 days.

(21) Appl. No.: 19/253,575

(22) Filed: Jun. 27, 2025

Related U.S. Application Data

(60) Provisional application No. 63/666,087, filed on Jun. 28, 2024.

(51) Int. Cl.
| | |
|---|---|
| *E04G 23/02* | (2006.01) |
| *B32B 3/28* | (2006.01) |
| *B32B 27/08* | (2006.01) |

(52) U.S. Cl.
CPC ............ *E04G 23/0281* (2013.01); *B32B 3/28* (2013.01); *B32B 27/08* (2013.01); *B32B 2250/02* (2013.01); *B32B 2250/24* (2013.01); *B32B 2571/00* (2013.01)

(58) Field of Classification Search
CPC .. E04G 21/28; E04G 23/0281; B32B 2571/00
See application file for complete search history.

(56) References Cited

U.S. PATENT DOCUMENTS

| | | | | |
|---|---|---|---|---|
| 1,871,101 | A * | 8/1932 | Waltz | B63B 19/24 |
| | | | | 160/390 |
| 2,848,233 | A | 8/1958 | Wynn | |
| 3,202,193 | A | 8/1965 | Louis | |
| 4,590,714 | A * | 5/1986 | Walker | B32B 27/26 |
| | | | | 5/417 |
| 6,363,661 | B1 * | 4/2002 | Myers | A01F 25/13 |
| | | | | 52/2.13 |
| 6,739,095 | B2 | 5/2004 | Glynos | |
| 7,152,614 | B2 | 12/2006 | Kalnay | |

(Continued)

FOREIGN PATENT DOCUMENTS

| | | | | |
|---|---|---|---|---|
| DE | 202008008845 | | 11/2009 | |
| DE | 102018204397 | A1 * | 9/2019 | ............ D06M 17/00 |

(Continued)

*Primary Examiner* — Babajide A Demuren

(74) *Attorney, Agent, or Firm* — Loginov & Associates, PLLC; William A. Loginov

(57) ABSTRACT

This invention provides a weighted tarpaulin (tarp) that allows for water, as a weight, to be readily introduced to a tarp when installed and distributed effectively around the tarp to ensure it remains securely engaged against the roof or other surface across its entire surface area. The tarp comprises two layers of durable polymer that are welded or otherwise adhered to define a series of interconnected cells in a grid pattern. The cells can be filled with water from a hose, via fittings. The tarp includes an extended material strip that extends beyond perimeter cells so as to provide a surface to receive supplemental/optional fasteners. This strip can include holes/grommets for such fasteners. The cells meet at a series of junctions that provide fluid connection therebetween. One or more cells can include a small valve to allow bleed-off of air and water.

17 Claims, 8 Drawing Sheets

(56)            References Cited

U.S. PATENT DOCUMENTS

| | | | | |
|---|---|---|---|---|
| 7,392,620 | B1 * | 7/2008 | Watson, Jr. ............... | E04H 9/14 |
| | | | | 52/DIG. 14 |
| 8,777,516 | B2 | 7/2014 | Slutz | |
| 11,452,261 | B2 * | 9/2022 | Bird ...................... | A01D 75/00 |
| 12,104,391 | B2 * | 10/2024 | Latimore ................ | E04G 21/28 |
| 2004/0194393 | A1 * | 10/2004 | Horman ................... | E04B 1/66 |
| | | | | 52/3 |
| 2006/0010815 | A1 * | 1/2006 | Dixon .................... | E04G 21/28 |
| | | | | 52/514 |
| 2006/0150537 | A1 * | 7/2006 | Baum .................... | E04G 21/28 |
| | | | | 52/90.1 |
| 2007/0193121 | A1 * | 8/2007 | Diaz ...................... | E04G 21/28 |
| | | | | 52/3 |
| 2009/0056780 | A1 | 3/2009 | Glynos | |
| 2009/0178346 | A1 * | 7/2009 | Diaz ...................... | E04G 21/28 |
| | | | | 52/3 |
| 2009/0235496 | A1 * | 9/2009 | Baum .................... | E04G 21/28 |
| | | | | 24/458 |
| 2010/0083587 | A1 * | 4/2010 | Glynos .................. | A01F 25/13 |
| | | | | 52/3 |
| 2014/0328629 | A1 | 11/2014 | Slutz | |
| 2019/0128011 | A1 * | 5/2019 | Derbes ................... | E04H 15/20 |
| 2020/0056388 | A1 | 2/2020 | Cohen | |
| 2021/0324641 | A1 * | 10/2021 | Jimenez ................. | E04G 21/28 |

FOREIGN PATENT DOCUMENTS

| | | |
|---|---|---|
| JP | 2002121932 | 4/2002 |
| RU | 2767808 | 3/2022 |
| WO | 2007027167 | 3/2007 |

* cited by examiner

TARPAULIN FOR COVERING BUILDING ROOFS AND SURFACES

RELATED APPLICATION

This application claims the benefit of U.S. Provisional Application Ser. No. 63/666,087, entitled TARPAULIN FOR COVERING BUILDING ROOFS AND SURFACES, filed Jun. 28, 2024, the teachings of which is expressly incorporated herein by reference.

FIELD OF THE INVENTION

This invention relates to weighted tarpaulins for temporarily covering roofs and other surfaces, and more particularly to water-filled tarpaulins.

BACKGROUND OF THE INVENTION

Tarpaulins (also termed, simply, "tarp" or "tarps") are a ubiquitous item in building and maintenance activities. They are used to temporarily cover surfaces to prevent infiltration of rain, snow and other moisture, as well as airborne detritus, such as dust and leaves. A common use for tarps is as a temporary cover for roofs suffering damage, or under construction. The user positions the tarp over the exposed area of the roof, and often places uses nails or other fasteners through grommets on the tarpaulin, or through other edge material, to secure it in place. The act of nailing the tarpaulin can be partially effective in maintaining it in place, although it is still subject to lifting between nail spots in strong winds and a large number of nails may further compromise roof integrity.

A technique to minimize the need to nail down the tarp involves using weights to hold it in place. On a flat surface, external weights are useful, but on a pitched roof, such external weights tend to fall off. Prior art tarps have been designed with external weighting systems—for example using sand and water. Weighted tarps are shown and described in Published U.S. Patent Application No. 2021/0324641, entitled TARP SYSTEM (tarps with water-filled pockets) and Published U.S. Patent Application No. 2020/0056388, entitled TARPAULIN APPARATUS AND METHOD FOR COVERING (tarps with fabric pockets for solid weights/sand), which are incorporated herein by reference as useful background information. These designs have certain limitations and are can be challenging to install due to the need to fill multiple pockets with a weighting material-particularly when deployed on a pitched roof.

SUMMARY OF THE INVENTION

This invention overcomes the disadvantages of the prior art by providing a weighted tarpaulin (tarp) that allows for water, as a weight, to be readily introduced to a tarp when installed and distributed effectively around the tarp to ensure it remains securely engaged against the roof or other surface across its entire surface area. The tarp comprises two layers of durable polymer that are welded or otherwise adhered to define a series of interconnected cells in a grid pattern. The cells can be filled with water (and optionally, a mixture of appropriate antifreeze) from (e.g.) a common garden hose via one or more fittings. The tarp includes an extended material strip that extends beyond perimeter cells so as to provide a surface to receive supplemental/optional fasteners (e.g.) nails. This strip can include holes/grommets for such fasteners. The cells meet at a series of junctions that provide fluid connection therebetween and can include a center sealed region (weld dots) for additional structural integrity-thus forming an interconnection rectangle/square at each internal junction. One or more cells can include a small valve to allow bleed-off of air and water so as to more completely and efficiently fill the cell grid.

In an illustrative embodiment, a weighted tarpaulin (tarp) is provided, with at least a top layer and a bottom layer of polymer sheet defining unadhered regions of cells having a length greater than the width. The tarp defines a volume that is constructed and arranged to receive a predetermined quantity of water in the volume. The cells are in fluid communication with each other so as to define a grid. At least one fill/drain tap, mounted on one of the cells, receives water from a pressurized water source. Junctions are defined between the top layer and the bottom layer that interconnect adjacent cells in the grid. Illustratively, the grid is arranged in a plurality of rows and columns defining central areas between each of the cells. The tarp can be arranged to be centered over a ridge of a pitched roof, with central areas thereof overlying the roof extend downwardly on each of opposing sides of the roof. The fill/drain tap can be mounted adjacent the ridge. A bleed tab can be located on at least one of the cells. The bottom layer can define a perimeter that, at some or all portions thereof, extends beyond a perimeter of the top layer so as to define an extension, the extension adapted to receive fasteners therethrough. At least one portion of the extension extends a greater distance from the top layer than other portions of the extension, sized and arranged to be positioned under roof shingles. At least some of the junctions each include a weld dot respectively.

In an illustrative embodiment, a method for covering at least a portion of a roof is provided. The method includes applying the above-described tarp over the portion, and subsequently filling the tarp through the tap with water so as to provide holding weight thereto. At least a portion of a perimeter of the tarp can be secured to the roof using through-fasteners. The tarp can be placed over each of opposing sides of a ridge of the roof prior to fastening and/or filling with water.

BRIEF DESCRIPTION OF THE DRAWINGS

The invention description below refers to the accompanying drawings, of which:

FIG. 4 is a diagram showing the tarp on the roof as shown in FIG. 3, with one row of the weighted grid folded over another row to expose an underside thereof;

DETAILED DESCRIPTION

Figure 1:
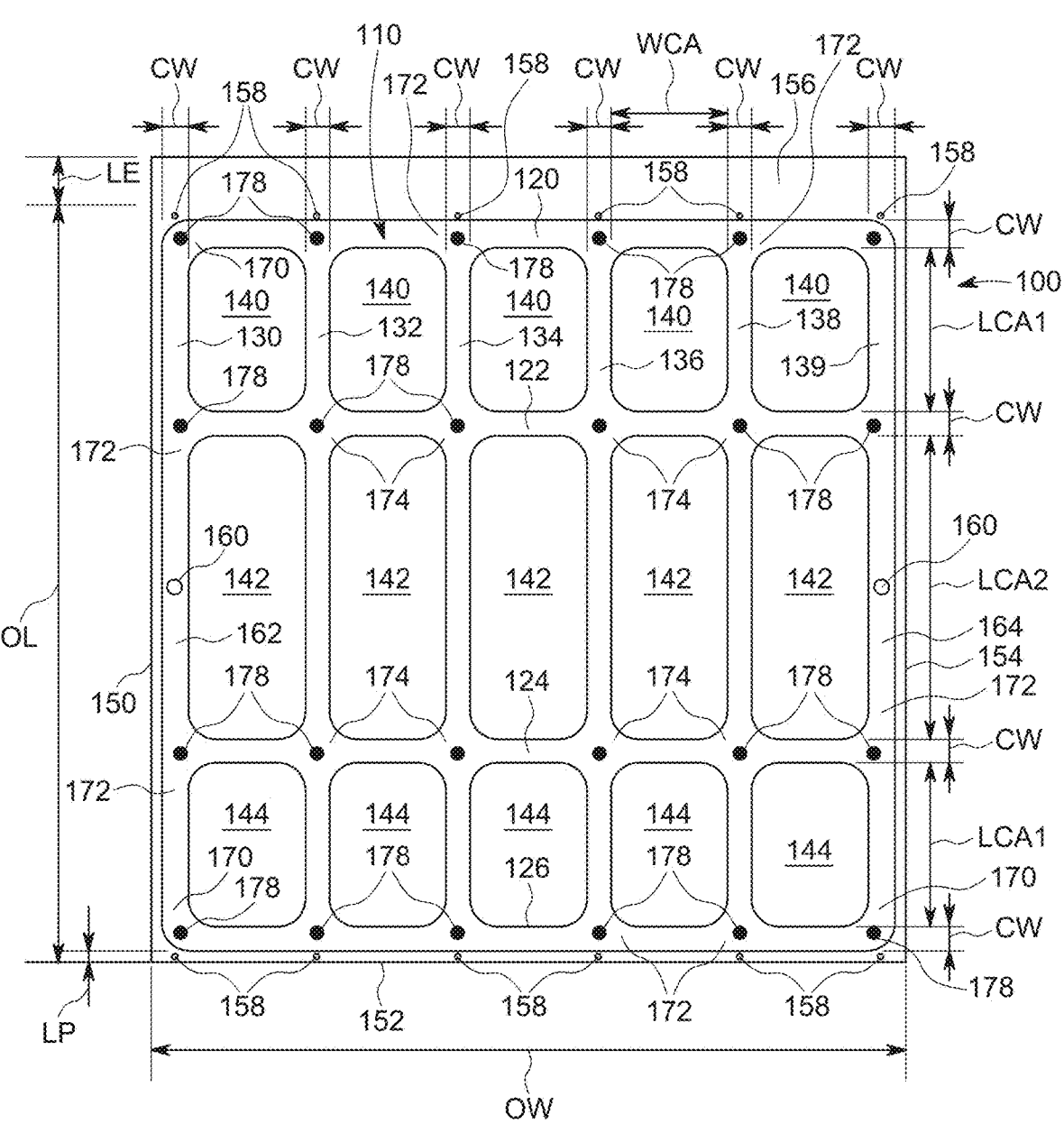
FIG. 1 is a diagram showing a plan view of the weighted tarp according to an exemplary embodiment.

FIG. 1 shows a weighted tarp 100 for temporarily covering a surface, such as a roof. The tarp is typically constructed of two layers of a durable polymer fabric, such as PVC, Hypalon™, and/or another acceptable sheet material, having a thickness of between approximately 7 millimeters (mm) and 10 mm. The material can be homogeneous polymer sheet or can be a fiber-reinforced material. The layers of material are thermally or ultrasonically welded, or otherwise adhered together (e.g. using a compatible adhesive) along their confronting surfaces except where they remain unadhered to define a grid 110 consisting a series of orthogonal (in this example), parallel rows 120, 122, 124 and 126, and columns 130, 132, 134, 136, 138 and 139. These unadhered regions in the grid define an interconnected network of cells, which can be filled with water or a similar liquid. Optionally, in cold weather climates where freezing is possible, the fill water can be mixed with an appropriate formulation and concentration of antifreeze. Such antifreeze can be a non-toxic type-such as propylene glycol, also known as RV and Marine antifreeze. Other freeze resistant liquids, such as alcohol can be used in alternate embodiments. The antifreeze can be added to the cells either before or after (at least partial) filling of the cells. In an embodiment, the layers can be sealed primarily at the cells' edges and unadhered in the central areas 140, 142 and 144 between cells, so long a relatively watertight seal is maintained at the cell edges to prevent migration of water into the central areas. More typically, the layers are fully adhered to each other at all locations except the inner spaces of the cells of the grid 110. The cells in this embodiment generally define an aspect ratio with a length (elongation direction) several (e.g. 5 to 15 times their width). The upper layer is adhered to the lower layer in such a way to define a space/volume within each cell to receive predetermined amount of water. In this embodiment, when filled, the cells extend approximately 63-64 millimeters in height above the plane of the lower layer. Note that the width WCA of the central areas 140, 142 and 144 between cells is approximately 460 mm (18 inches) in this exemplary embodiment, while the length LCA1 of the outer central areas 140 and 144 is approximately 625 mm (24-25 inches) and the length LCA2 of the middle central areas 142 is approximately 1250 mm (4.1 ft.).

The perimeter edges 150, 152, 154 and 156 of tarp 100 defines an extension of at least the bottom layer beyond the grid 110, which provides an apron for attachment of fasteners/nails. Holes and/or grommets 158 are located at predetermined intervals along opposing side edges 152 and 156, for receiving fasteners/nails. As described below, these two edges can be placed on opposing sides of a pitched roof and/or along the top and bottom portions of an inclined surface to further secure the tarp 100. Notably, the perimeter edges 150, 152 and 154 have a length of extension LP from the grid of (e.g.) approximately 50 millimeters (mm) (or 2 inches). The side edge 156 is further extended LE by another 200 mm (or 8 inches). This additional extension length allows this edge to be tucked under roof shingles and/or overlapped onto an adjacent tarp to enhance water-tightness and security.

By way of non-limiting example, the exemplary tarp has an overall length OL of approximately 3000 mm (or 10 feet) no including the extension LE, and an overall width OW of approximately 3000 mm. The cell widths CW are approximately 100 mm (or 4 inches). These dimensions are only exemplary of a wide range of measurements. Likewise, the number and dimension of grid cells is highly variable based upon application and overall size of the tarp. The arrangement should be sufficient to provide hold-down weight to the tarp on a surface under predetermined wind and weather conditions.

The center region of the tarp 100 includes opposing fill/drain taps 160, located, for example, at the approximate center of the length OL on each side of the perimeter 150 and 154. The taps 160 are mounted in fluid communications with opposing edge cells 162 and 164. In an exemplary embodiment, the taps 160 can include a standard garden hose female (or male) thread and an appropriate, removable cap to seal against leakage. A check valve can be included in an alternate embodiment, which allows water to enter the grid 110, while resisting escape. Such a check valve arrangement can be released using appropriate mechanisms, clear to those of skill, so that water can be drained from the grid. By way of non-limiting example, the grid can contain approximately 18-20 gallons of water, which translates into a distributed weight of approximately 180-190 pounds.

The cells are in fluid communication with each other via junctions that define corners 170, perimeter T-shaped junctions 172 and central crossing junctions 174. To reinforce the junctions 170, 172 and 174, each one includes a weld dots 178 of between 25 and 50 mm in diameter in an exemplary embodiments.

Figure 2:
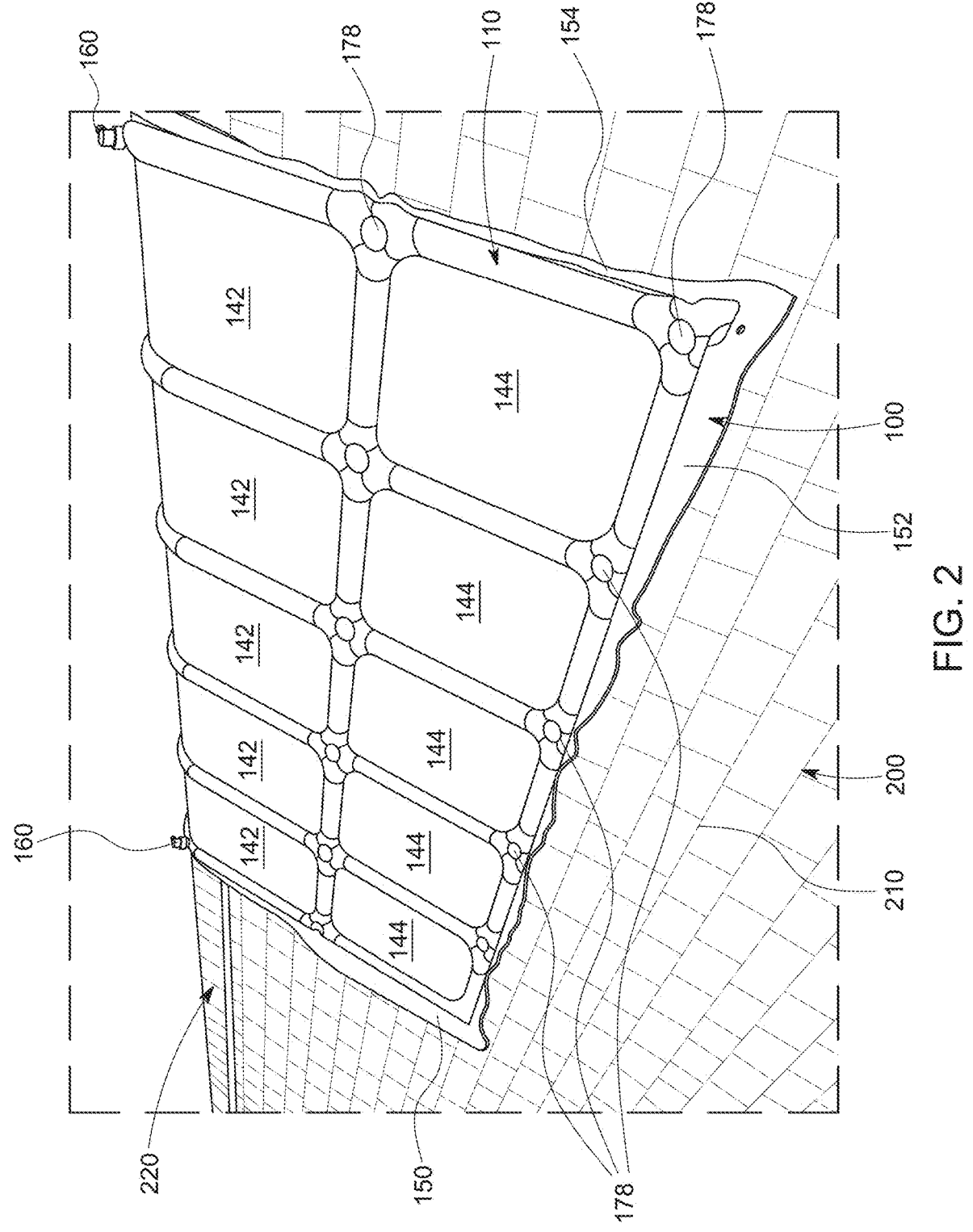
FIG. 2 is a diagram showing the tarp of FIG. 1 installed on the ridge of an exemplary pitched roof from a first perspective.
Figure 3:
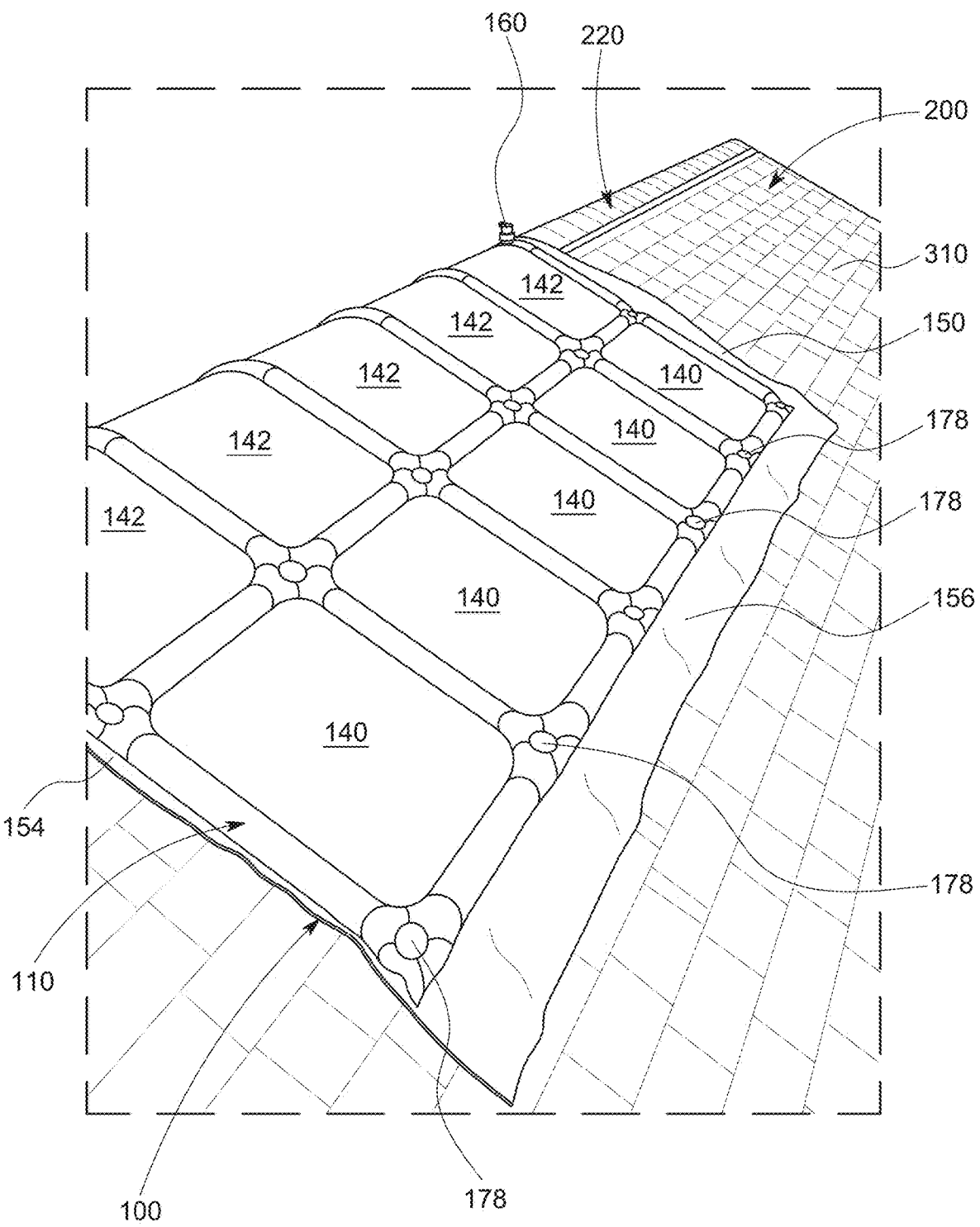
FIG. 3 is a diagram showing the tarp installed on the roof of FIG. 2 from an opposing, second perspective.
Figure 4:
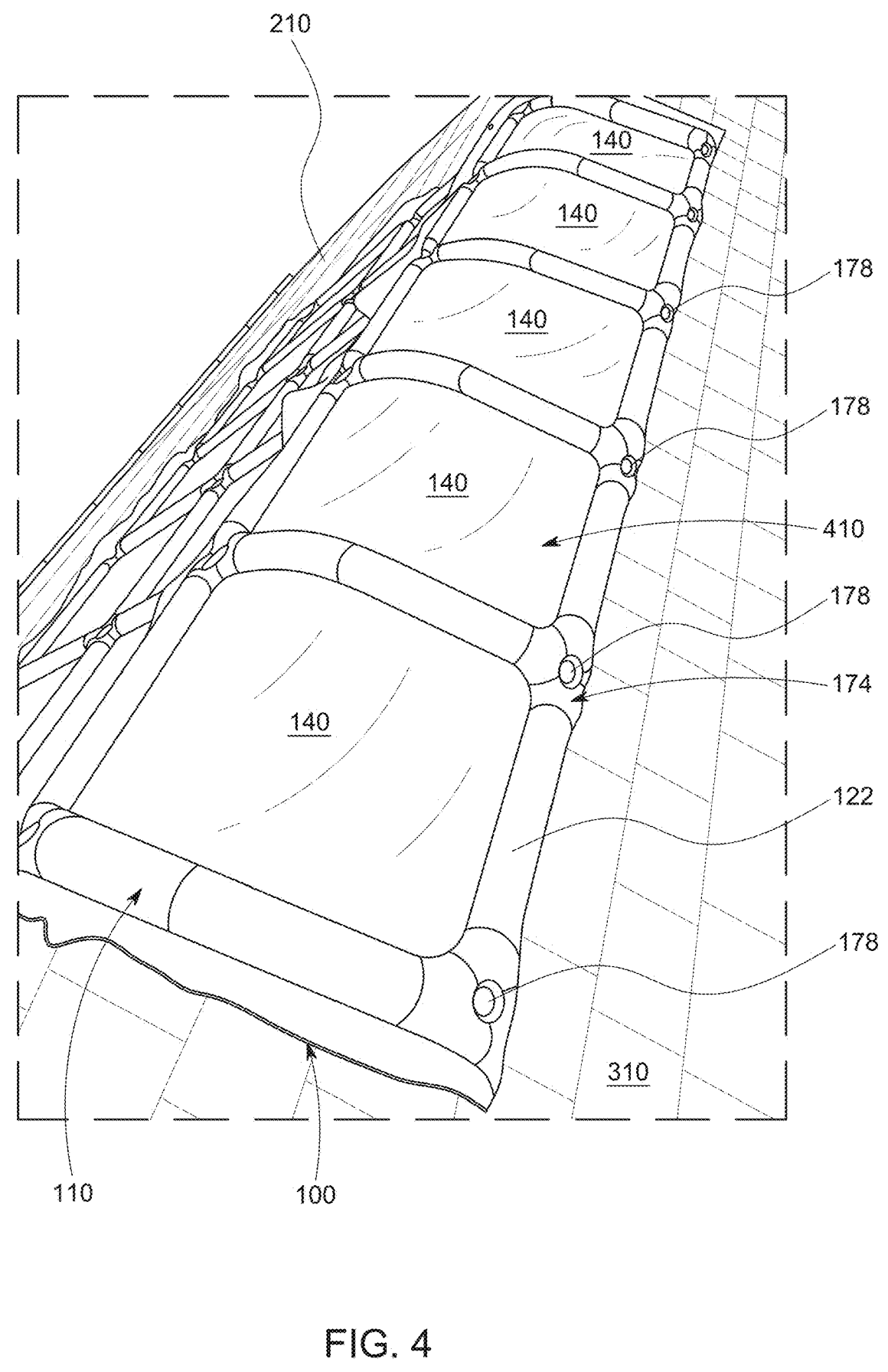

With further reference to FIGS. 2-4, the tarp 100 is shown deployed on each of opposing sides 210 and 310 of an exemplary, pitched roof 200. The tarp 100 is approximately centered about the ridge 220 of the roof 200. The length of the central regions 142 is approximately doubled so as to define similarly sized rectangles to that of the opposing end regions 140, 144 on either side of the ridge 220. Thus, the water-filled grid 110 is free of cells along the ridge 220 in this exemplary deployment.

Figure 5:
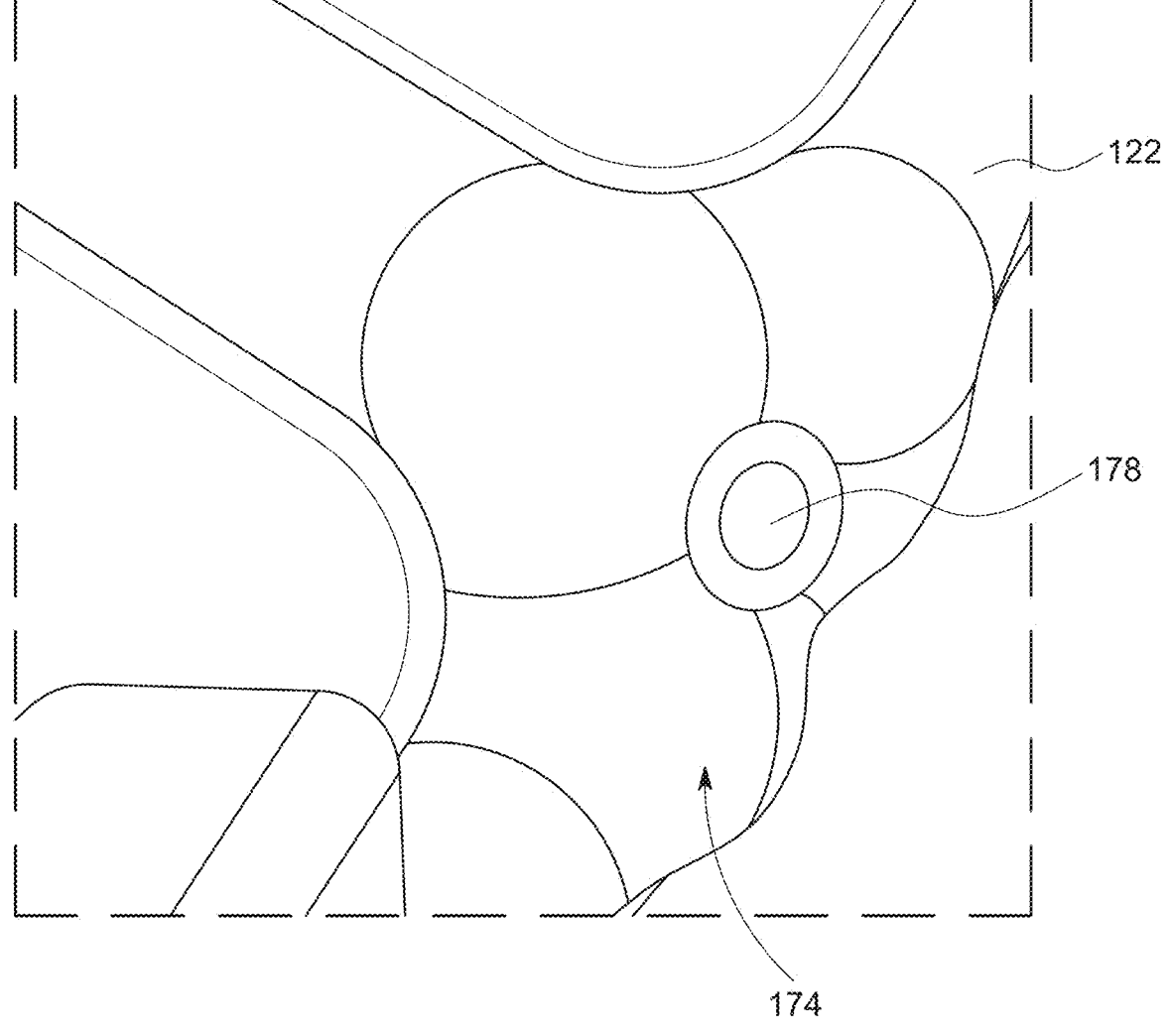
FIG. 5 is a diagram showing a fragmentary perspective view of a square junction of cells in the grid of the tarp in FIG. 4.
Figure 6:
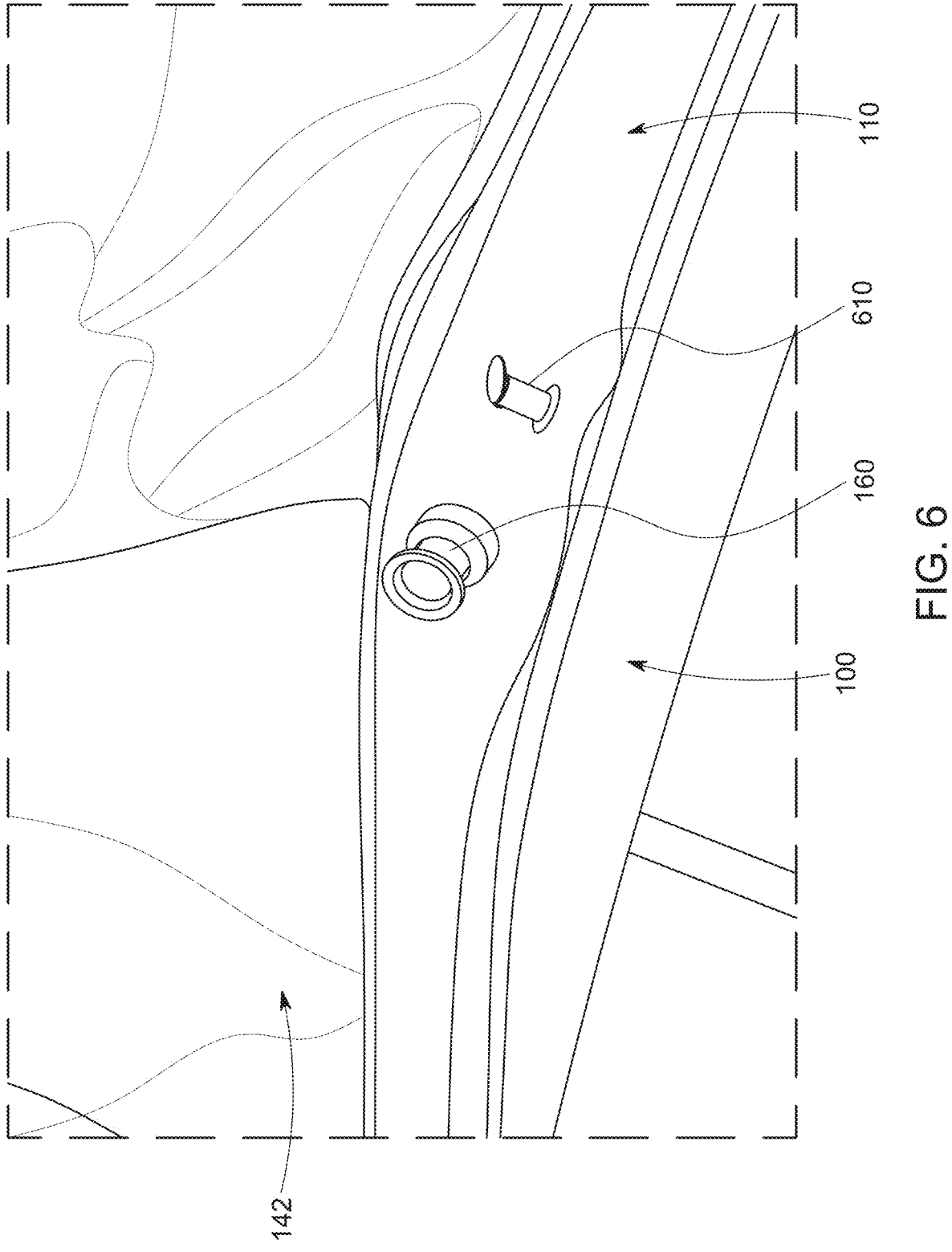
FIG. 6 is a diagram showing a fragmentary perspective view of an edge of the tarp in FIG. 2, including a water fill/drain tap and bleed fitting.

In operation, the user installs the tarp 100 by transporting it unfilled to the surface to be covered (e.g., the roof 200). By way of non-limiting example, the empty weight of the tarp 100 is approximately 180-190 pounds in an embodiment. The tarp is unfolded or otherwise spread over the surface to be covered as shown in FIGS. 2-4. Note that the tarp upper layer can be one color or shade (e.g. black) and the lower layer can be another distinct color or shade (e.g. white). Thus, as shown in FIGS. 4-5 the tarp edge is folded over as shown, revealing a different color/shade for the exposed lower layer 410. Once, positioned, the user attaches a pressurized garden hose, or other water source to the fill/drain tap 160 on the tarp 100 to fill the grid of cells 110. The filled cells apply additional weight to the overall structure, helping to maintain it in place against wind and weather and ensuring a perimeter seal against the roof that resists infiltration by the elements. As shown in FIG. 6, each opposing tap 160 is positioned at or near the centerline, so as to reside at or near the top of the roof ridge 210 in the exemplary arrangement of FIGS. 2-4.

While filling, a small air vent tab 610 (FIG. 6), adjacent to each fill/drain tap 160 can be selectively opened and closed to bleed air out of the grid. This tab 610 can be similar or identical to a conventional inflatable toy air filling valve. Note that both the tap 160 and tab 610 are located so as to reside at or near the top of the ridge. Thus, when filling, the opposing sides of the grid will fill completely first and finally fill the area around the ridge. This ensures minimal air bubbles within the grid, and even evacuation of air toward the high point on the installed tarp.

Before, during, of after filling the grid 110, the perimeter can be secured to the roof surface using through-fasteners (such as screws, nails, staples, etc.) at one or more location to prevent sliding, though the majority of mechanical adherence to the surface is provided by the friction of the weighted lower surface as it engages the roof (or other surface). While not shown, the lower surface can include-adjacent the perimeter, and beneath the outer cell(s)—a frictional surface material, such a neoprene and/or a textured coating.

Figure 7:
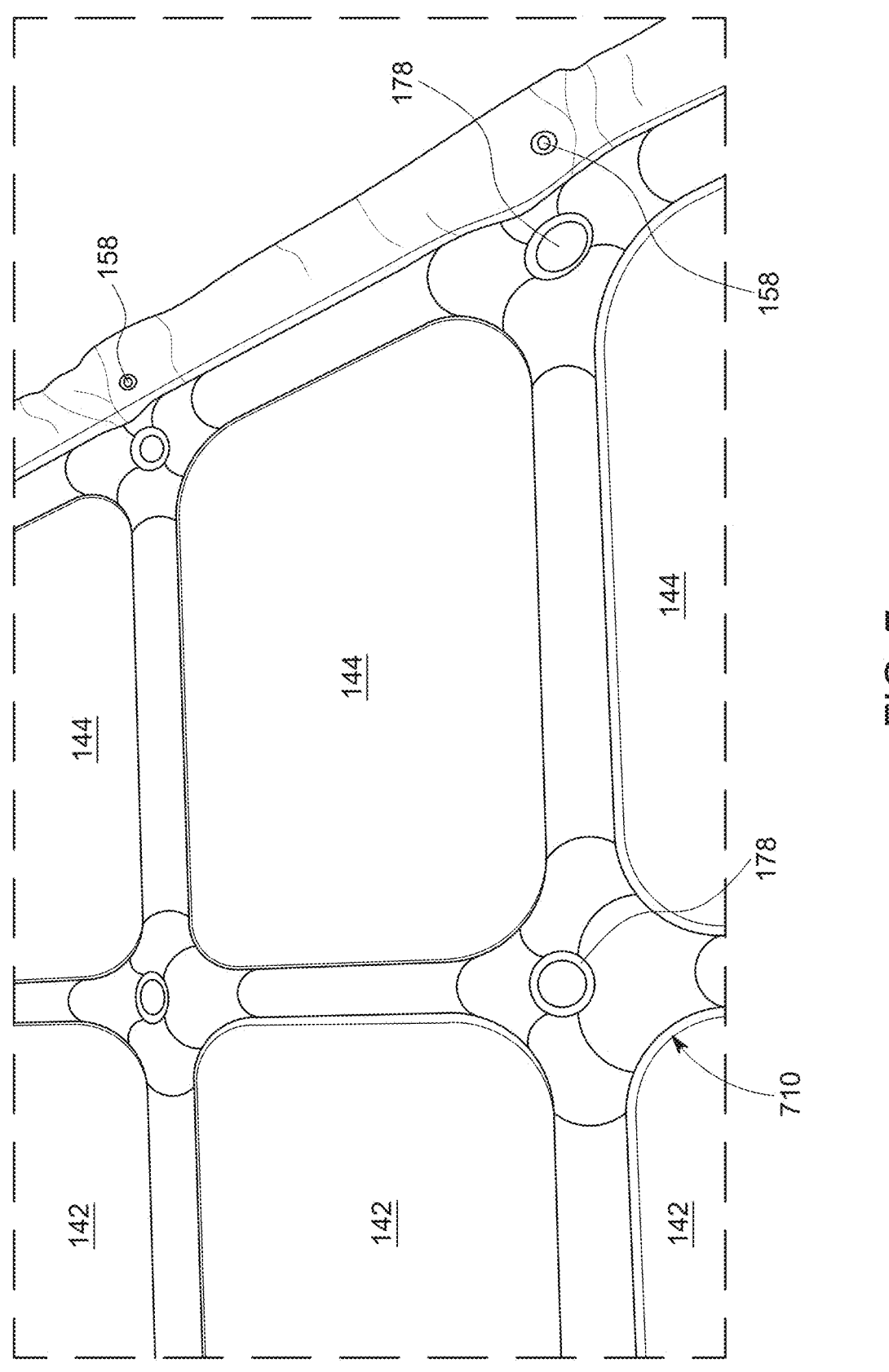
FIG. 7 is another fragmentary perspective view of the tarp edge and interior further detailing weld dots at junctions of the cells.
Figure 8:
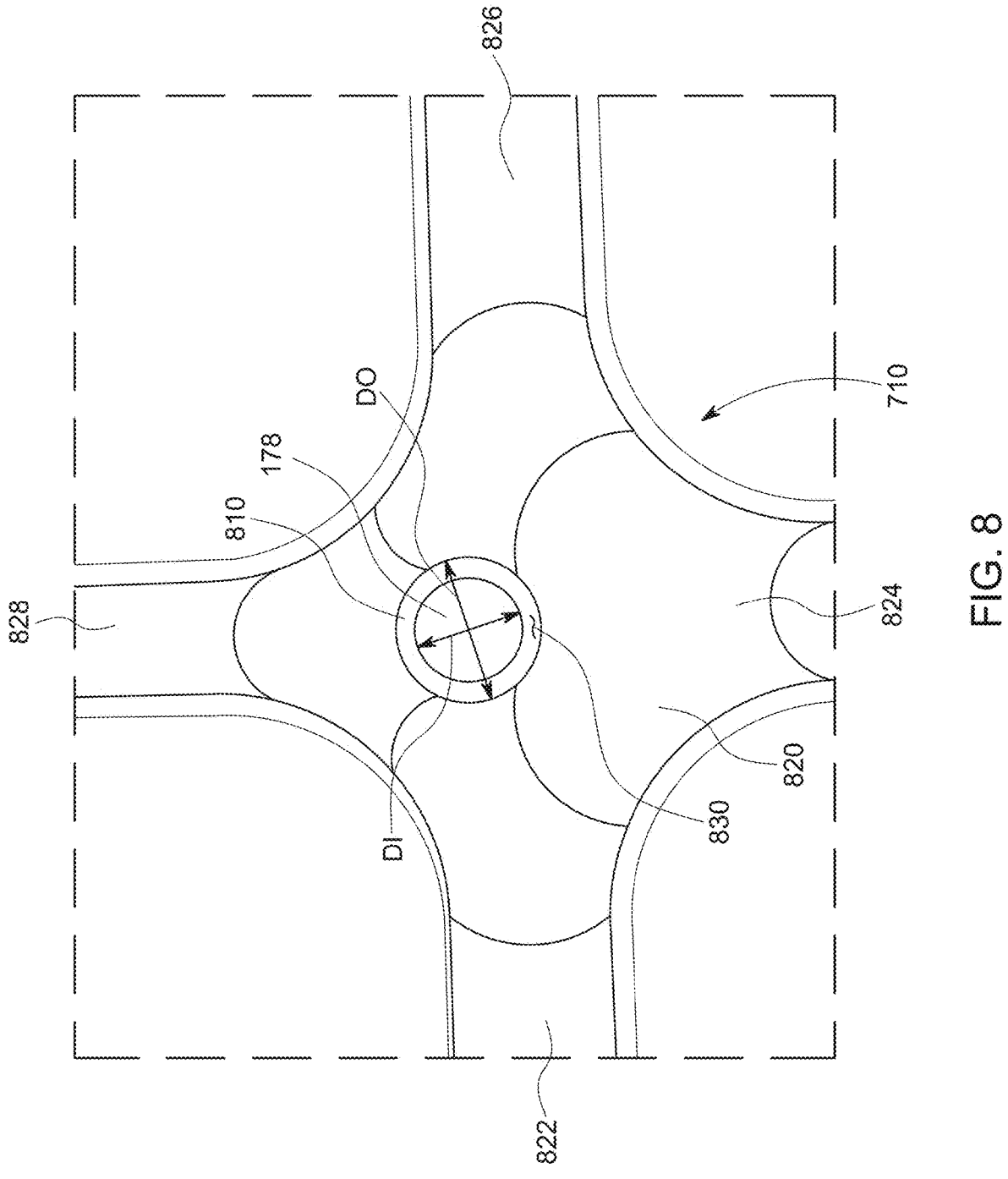
FIG. 8 is a more detailed fragmentary perspective view of an internal junction and associated weld dot.

With reference to FIG. 5, a weld dot 178 is shown with respect to the lower layer junction 174. The weld dot 178 resides within the center of each junction (170, 172 and 174). The dot 178 serves to adhere the layers together in an island around an open fluid channel between cells. The dot 178 can be formed by ultrasonic and/or thermal welding (and/or adhesive) using appropriate techniques. It can be formed with concentric annular weldments, as shown. With reference to FIGS. 7 and 8, the weld dots 178 at each cell junction are shown in further detail, according to an exemplary implementation. With reference to an exemplary internal junction 710 of cells 822, 824, 826 and 828, the associated weld dot is shown in further detail. Notably, the weld dot 178 is adapted to help eliminate stress at any one point in the cell junctions/intersections, and thereby reinforce the overall structural integrity of the tarp. The weld dot 178 can have an overall diameter DD of between approximately 0.75 and 2 inches. The outer annulus 830 of the dot 178 is adhered to the lower tarp layer to create the depicted circular pleat at the junction 710. The adhered (e.g. welded) annulus 830 can have a radius of approximately 0.25 and 0.5 inch so that the inner diameter DD of the weld dot (which is typically unadhered, but closely conforming to the lower layer) is between approximately 0.5 and 1.75 inches. The precise measurements of DD and DI can vary based upon materials and construction techniques.

When the tarp is no longer needed, the water weight can be drained by opening one or both taps and manipulating the tarp to place then in a lowered position—for example flipping sides of the tarp as shown in FIG. 4 and/or rotating it 90 degrees. Alternatively, a drain tap can be provided, respectively, (not shown) on opposing corners so as to provide a low point for drainage on the installed tarp.

Note, according to an alternate embodiment the cells may not be entirely in a single fluid circuit. In alternate embodiments, two (or more) separate circuits of cells can be provided, each with a respective fill/drain tap (160) and associated vent tab(s). Likewise, the various junctions 170, 172 and 174 can either interconnect all adjacent cells (as shown), or junctions can be connected to only some of their adjacent cells, thereby forming a more-serpentine/circuitous fluid interconnection of cells in the grid.

It should be clear that the above-described tarp provides an effective, economical and straightforward arrangement for temporarily covering an outdoor surface, such as a roof. It avoids the use of separate weights that can prove dangerous to carry and install, and potentially fall on passers-by, by substituting a supply of pressurized water that can be delivered via a single hose connection, and readily drained in a non-damaging manner. The tarp is constructed from conventional material using relatively conventional techniques, and thus, provided a highly economical arrangement for temporary coverage of a roof or other large area.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, also as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Accordingly, this description is meant to be taken only by way of example, and not to otherwise limit the scope of this invention.

What is claimed is:

1. A weighted tarpaulin (tarp) comprising:
   at least a top layer and a bottom layer of polymer sheet defining unadhered regions of cells having a length greater than the width and defining a volume that is constructed and arranged to receive a predetermined quantity of water in the volume,
   wherein the cells are in fluid communication with each other so as to define a grid;
   at least one fill/drain tap, mounted on one of the cells, for receiving water from a pressurized water source; and
   junctions defined between the top layer and the bottom layer that interconnect adjacent cells in the grid;
   wherein at least some of the junctions each include a weld dot, respectively.

2. The weighted tarp as set forth in claim 1, wherein the grid is arranged in a plurality of rows and columns defining central areas between each of the cells.

3. The weighted tarp as set forth in claim 2, wherein the tarp is arranged to be centered over a ridge of a pitched roof and central areas overlying the roof extend downwardly on each of opposing sides of the roof.

4. The weighted tarp as set forth in claim 3, wherein the fill/drain tap is mounted adjacent the ridge.

5. The weighted tarp as set forth in claim 4, further comprising a bleed tab on at least one of the cells.

6. The weighted tarp as set forth in claim 4, wherein the bottom layer defines a perimeter that, at some or all portions thereof, extends beyond a perimeter of the top layer so as to define an extension, the extension adapted to receive fasteners therethrough.

7. The weighted tarp as set forth in claim 6, wherein at least one portion of the extension extends a greater distance from the top layer than other portions of the extension, sized and arranged to be positioned under roof shingles.

8. A weighted tarpaulin (tarp) comprising:
   at least a top layer and a bottom layer of polymer sheet defining unadhered regions of cells having a length greater than the width and defining a volume that is constructed and arranged to receive a predetermined quantity of water in the volume,
   wherein the cells are in fluid communication with each other so as to define a grid;

at least one fill/drain tap, mounted on one of the cells, for receiving water from a pressurized water source; and junctions defined between the top layer and the bottom layer that interconnect adjacent cells in the grid, wherein the grid is arranged in a plurality of rows and columns defining central areas between each of the cells, wherein the tarp is arranged to be centered over a ridge of a pitched roof and central areas overlying the roof extend downwardly on each of opposing sides of the roof, wherein the fill/drain tap is mounted adjacent the ridge, and wherein at least some of the junctions each include a weld dot, respectively.

9. A method for covering at least a portion of a roof with a tarp comprising (a) at least a top layer and a bottom layer of polymer sheet defining unadhered regions of cells having a length greater than the width and defining a volume that is constructed and arranged to receive a predetermined quantity of water in the volume, wherein the cells are in fluid communication with each other so as to define a grid, (b) at least one fill/drain tap, mounted on one of the cells, for receiving water from a pressurized water source, and (c) junctions defined between the top layer and the bottom layer that interconnect adjacent cells in the grid, at least some of the junctions being provided with a weld dot, respectively, the method comprising the steps of:

applying the tarp over the portion; and subsequently filling the tarp through the tap with water so as to provide holding weight thereto.

10. The method as set forth in claim 9, wherein the step of filling includes providing the water to fill the grid in a plurality of rows and columns defining central areas between each of the cells.

11. The method as set forth in claim 9, further comprising, centering the tarp over a ridge of a pitched roof and central areas overlying the roof extend downwardly on each of opposing sides of the roof.

12. The method as set forth in claim 11, wherein the step of filling includes providing the water to a fill/drain tap mounted adjacent the ridge.

13. The method as set forth in claim 9, further comprising, operating a bleed tab on at least one of the cells.

14. The method as set forth in claim 9, wherein the bottom layer defines a perimeter that, at some or all portions thereof, extends beyond a perimeter of the top layer so as to define an extension, and directing fasteners through the extension and into the roof.

15. A method for covering at least a portion of a roof with a tarp comprising (a) at least a top layer and a bottom layer of polymer sheet defining unadhered regions of cells having a length greater than the width and defining a volume that is constructed and arranged to receive a predetermined quantity of water in the volume, wherein the cells are in fluid communication with each other so as to define a grid, (b) at least one fill/drain tap, mounted on one of the cells, for receiving water from a pressurized water source, and (c) junctions defined between the top layer and the bottom layer that interconnect adjacent cells in the grid, wherein the bottom layer defines a perimeter that, at some or all portions thereof, extends beyond a perimeter of the top layer so as to define an extension, and directing fasteners through the extension and into the roof, and wherein at least one portion of the extension extends a greater distance from the top layer than other portions of the extension, sized and positioning the at least one portion of the extension under roof shingles, the method comprising the steps of:

applying the tarp over the portion; and subsequently filling the tarp through the tap with water so as to provide holding weight thereto.

16. The method as set forth in claim 9, further comprising, securing at least a portion of a perimeter of the tarp to the roof using through-fasteners.

17. The method as set forth in claim 16, wherein the step of applying includes placing the tarp over each of opposing sides of a ridge of the roof.

* * * * *